July 8, 1952 C. E. WELLMAN 2,602,238
BORING JIG OR DRILL GUIDE
Filed April 27, 1949
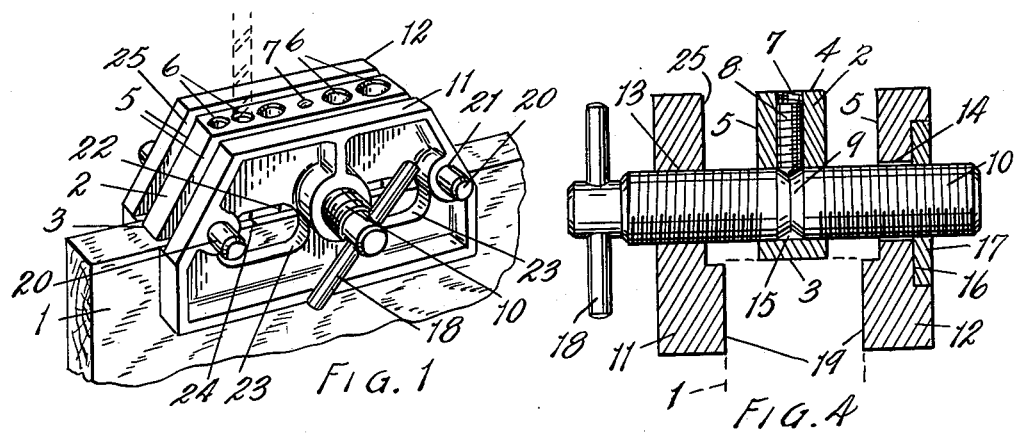
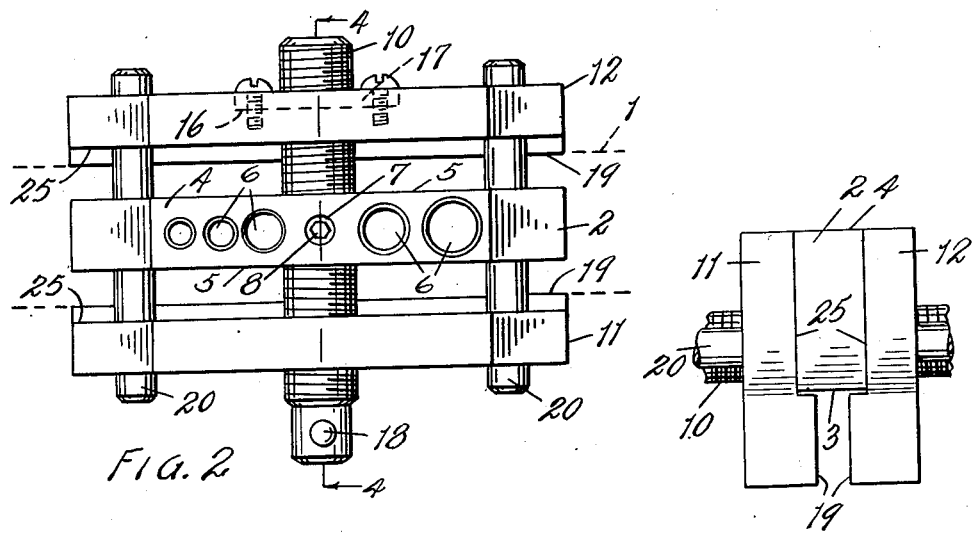
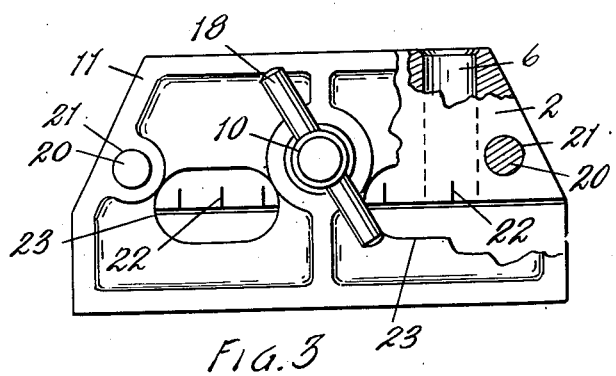
INVENTOR.
Clifton E. Wellman
BY
Attorney.

Patented July 8, 1952

2,602,238

UNITED STATES PATENT OFFICE 2,602,238

BORING JIG OR DRILL GUIDE

Clifton E. Wellman, Hastings, Mich.

Application April 27, 1949, Serial No. 89,869

6 Claims. (Cl. 33—189)

This invention relates to improvements in boring jigs or drill guides.

The main objects of this invention are:

First, to provide a dowel boring jig or drill guide which is capable of a wide adaptation to work of differing sections and shapes.

Second, to provide a self-centering boring jig or drill guide which is very easily adjusted, adapting it for use by relatively unskilled persons such as students, hobby workers, and the like as well as being well adapted for use by skilled mechanics and factory workers.

Third, to provide a structure embodying these advantages which is quite simple and economical in its parts.

Objects relating to details and economies of the invention will appear from the description to follow. The invention is defined and pointed out in the claims.

A preferred embodiment of the invention is illustrated in the accompanying drawing, in which:

Fig. 1 is a fragmentary perspective view of a boring jig embodying my invention clamped upon a piece of work, a drill or bit being indicated by dotted lines.

Fig. 2 is a plan view, work being indicated by dotted lines.

Fig. 3 is a fragmentary side elevational view, parts being broken away to show structure.

Fig. 4 is a vertical transverse section on a line corresponding to line 4—4 of Fig. 2, parts being shown in full lines for convenience in illustration.

Fig. 5 is a fragmentary section showing the clamp members in fully closed position.

In the accompanying drawing 1 represents a piece of work shown in full lines in Fig. 1 and in dotted lines in Figs. 2 and 4. The embodiment of my invention illustrated comprises a guide block or member 2 of rectangular section having parallel bottom and top surfaces 3 and 4 and parallel side surfaces 5. This guide member has a plurality of longitudinally spaced vertical guide bores 6 of different diameters. It also has a vertical internally threaded central bore 7 adapted to receive the threaded pin 8 which engages the annular groove 9 in the right and left hand threaded adjusting screw 10.

The clamp members 11 and 12 have bores 13 and 14 aligned with the bore 15 of the guide block. The screw is freely rotatable in the bores 14 and 15 and has threaded engagement with the bore 13 of the clamp member 11. The clamp member 12 has a recess 16 in its outer side providing a seat for the nut 17 in threaded engagement with one end of the adjusting screw 10 so that when the screw is rotated, as by means of the handle 18, the clamping members are simultaneously moved to or from the guide block.

The clamp members extend below the guide block and have opposed work clamping faces 19 below the guide block. To prevent the guide and clamp members getting out of alignment, the guide member is provided with laterally projecting guide rods 20 which are secured to the guide block and slidably engage bores 21 in the clamp members. The clamp members slide freely on the guide rods but serve to minimize twisting stresses on the screw.

To facilitate the positioning of the jig on a piece of work, the guide block or member is provided with indicia 22 indicating the centers of the bores. At least one of the clamp members is provided with openings 23 through which this indicia may be viewed. In practice the work, as indicated at 1, may desirably have a mark 24 thereon to indicate the point where it is desired to form the bore. To increase the range of adaptability of the device, that is, to adapt it to relatively narrow work, the inner sides of the clamp members are recessed at 25 to receive the guide block as is indicated in Fig. 5.

I have illustrated my invention in a highly practical embodiment thereof and one adapted for quite a wide range of uses. I have not attempted to illustrate or describe other adaptations or embodiments as it is believed that this disclosure will enable those skilled in the art to embody or adapt my invention as may be desired.

Having thus described my invention, what I claim as new and desire to secure by Letters Patent is:

1. In a dowel boring jig, the combination of a relatively thin horizontally elongated guide block having flat parallel top and bottom edges and parallel sides, said block having a longitudinally spaced series of vertical guide bores of different diameters and a central vertical threaded bore, a pair of work clamp members disposed at the sides of said guide block and having clamping faces extending below the bottom of the guide block, said guide block and clamp members having central aligned transverse bores, the bore of one of said clamp members being internally threaded, the other clamping member having a recess on its outer side and having a threaded nut member seated therein, a right and left hand threaded adjusting screw arranged through said transverse bores and having threaded engagement with the internally threaded bore of the one clamp member and being freely rotatable in the bore of said guide block and the bore of the other clamp member and having threaded engagement with the said nut thereof, said adjusting screw having a central annular groove therein disposed within said guide block, a retaining pin threaded into said threaded bore of said guide block to engage said annular groove in said screw, and laterally projecting guide rods on said guide block disposed on opposite sides of the screw, said clamp members having holes therein receiving said guide rods, one of said clamp members having openings therein, said guide block having indicia lines on its side aligned transversely with its guide bores and extending to the lower edge of the block to be visible through said openings, said openings also exposing an edge portion of the work.

2. In a dowel boring jig, the combination of a relatively thin horizontally elongated guide block having flat parallel top and bottom edges and parallel sides, said block having a longitudinally spaced series of vertical guide bores of different diameters and a central vertical threaded bore, a pair of work clamp members disposed at the sides of said guide block and having clamping faces extending below the bottom of the guide block, said guide block and clamp members having central aligned transverse bores, the bore of one of said clamp members being internally threaded, the other clamping member having a recess on its outer side and having a threaded nut member seated therein, a right and left hand threaded adjusting screw arranged through said transverse bores and having threaded engagement with the internally threaded bore of the one clamp member and being freely rotatable in the bore of said guide block and the bore of the other clamp member and having threaded engagement with the said nut thereof, said adjusting screw having a central annular groove therein disposed within said guide block, a retaining pin threaded into said threaded bore of said guide block to engage said annular groove in said screw, and laterally projecting guide rods on said guide block disposed on opposite sides of the screw, said clamp members having holes therein receiving said guide rods.

3. In a dowel boring jig, the combination of a relatively thin horizontally elongated guide block having parallel top and bottom edges and parallel sides, said block having a longitudinally spaced series of vertical guide bores of different diameters and a central vertical threaded bore, a pair of work clamp members disposed at the sides of said guide block and having clamping faces extending below the bottom of the guide block, the inner sides of the clamp members being recessed above said clamping faces to receive side portions of the guide block when the clamp members are closed thereon, said guide block and clamp members having central aligned transverse bores, the bore of one of said clamp members being internally threaded, the other clamping member having a recess on its outer side and having a threaded nut member seated therein, a right and left hand threaded adjusting screw arranged through said transverse bores and having threaded engagement with the internally threaded bore of the one clamp member and being freely rotatable in the bore of said guide block and the bore of the other clamp member and having threaded engagement with the said nut thereof, said adjusting screw having a central annular groove therein disposed within said guide block, a retaining pin threaded into said threaded bore of said guide block to engage said annular groove in said screw, and laterally projecting guide rods on said guide block disposed on opposite sides of the screw, said clamp members having holes therein receiving said guide rods.

4. In a dowel boring jig, the combination of a relatively thin horizontally elongated guide block having a plurality of guide bores of different diameters spaced longitudinally therealong, a pair of clamp members disposed at the sides of said guide block and having clamping faces extending below the guide block, an adjusting screw having right and left hand threaded engagement with said clamp members whereby they may be simultaneously adjusted to and from each other, said screw having an annular groove therein disposed within the guide block, a retaining pin carried by said guide block engaging said annular groove in said screw, and laterally projecting guide rods on said guide block disposed on opposite sides of the screw, said clamp members having holes therein receiving said guide rods, said guide block having indicia lines on its side aligned transversely with its bores and extending to the lower work engaging edge of the block, one of said clamp members being open to permit viewing of the indicia and exposing the adjacent portion of the work.

5. In a dowel boring jig, the combination of a relatively thin horizontally elongated guide block having a plurality of guide bores of different diameters spaced longitudinally therealong, a pair of clamp members disposed at the sides of said guide block and having clamping faces extending below the guide block, an adjusting screw having right and left hand threaded engagement with said clamp members whereby they may be simultaneously adjusted to and from each other, said screw having an annular groove therein disposed within the guide block, a retaining pin carried by said guide block engaging said annular groove in said screw, and a laterally projecting guide rod extending between said guide block and said clamp members, one of said clamp members having an opening therethrough exposing the lower side edge of said guide block alongside of said guide bores.

6. In a dowel boring jig, the combination of a relatively thin horizontally elongated guide member adapted to seat along its lower edge on the work and having vertical guide bores of different diameters centered transversely of its width, work clamp members disposed at the sides of the guide block and extending below the lower edge thereof, and a right and left hand threaded adjusting screw having threaded engagement with said clamp members for simultaneous adjustment thereof to and from the guide member, said screw being freely rotatably connected to said guide member and acting to maintain it in a central position relative to the clamp members while permitting the adjustment of the clamp members relative thereto, said guide member having bore centering indicia on its side associated with its bores, one of the guide members being open to permit viewing of such indicia, the opening also exposing the lower edge of said guide member and a portion of the work facilitating the positioning of the jig upon the work.

CLIFTON E. WELLMAN.

REFERENCES CITED

The following references are of record in the file of this patent:

UNITED STATES PATENTS

| Number | Name | Date |
|---|---|---|
| 48,018 | Hall | May 30, 1865 |
| 335,845 | Singer | Feb. 9, 1886 |
| 787,893 | Christoph | Apr. 25, 1905 |
| 809,069 | Lovett | Jan. 2, 1906 |
| 889,273 | Thomas | June 2, 1908 |
| 1,269,811 | Heritage | June 18, 1918 |
| 1,280,379 | Bonney | Oct. 1, 1918 |
| 2,470,038 | Long | May 10, 1949 |

FOREIGN PATENTS

| Number | Country | Date |
|---|---|---|
| 635,704 | Germany | Sept. 22, 1936 |